United States Patent
Tüchler

(10) Patent No.: US 8,081,882 B2
(45) Date of Patent: Dec. 20, 2011

(54) OPTICAL HIGH-RATE PULSE POSITION MODULATION SCHEME AND OPTICAL COMMUNICATIONS SYSTEM BASED THEREON

(75) Inventor: Michael Tüchler, Zürich (CH)

(73) Assignee: Oerlikon Space AG, Zurich (CH)

( * ) Notice: Subject to any disclaimer, the term of this patent is extended or adjusted under 35 U.S.C. 154(b) by 970 days.

(21) Appl. No.: 11/971,274

(22) Filed: Jan. 9, 2008

(65) Prior Publication Data

US 2008/0187322 A1 Aug. 7, 2008

(30) Foreign Application Priority Data

Feb. 6, 2007 (EP) ..................................... 07101803

(51) Int. Cl.
*H04B 10/04* (2006.01)
(52) U.S. Cl. ......................... 398/189; 398/191; 375/239
(58) Field of Classification Search ................... 398/189, 398/190, 191; 375/239, 238, 237
See application file for complete search history.

(56) References Cited

U.S. PATENT DOCUMENTS

| 5,684,871 A | 11/1997 | Devon et al. |
| 2003/0142691 A1 | 7/2003 | Hartmann |
| 2003/0142741 A1 | 7/2003 | Hartmann |
| 2003/0142742 A1* | 7/2003 | Hartmann ..................... 375/239 |

OTHER PUBLICATIONS

Extended European Search Report for Application No. EP 07 10 1803, Jul. 2007.

* cited by examiner

*Primary Examiner* — M. R. Sedighian
(74) *Attorney, Agent, or Firm* — McCormick, Paulding & Huber LLP

(57) ABSTRACT

It is an object of the present invention to provide a communications system for communication between two remote terminals, where even at very long distances between these two terminals and/or at very small signal-to-noise ratios a robust communication is possible. The invention achieves the goal set before by suggesting an inventive pulse position modulation scheme and a corresponding optical communications system. The system and method according to the invention are very well suited for communication with a satellite in deep space, for instance.

9 Claims, 6 Drawing Sheets

US 8,081,882 B2

OPTICAL HIGH-RATE PULSE POSITION MODULATION SCHEME AND OPTICAL COMMUNICATIONS SYSTEM BASED THEREON

CROSS REFERENCE TO RELATED APPLICATION

The present application claims the priority of the European patent application no. 07 101 803.0 filed 6 Feb. 2007.

FIELD OF THE INVENTION

The present invention concerns a pulse position modulation scheme and optical communications systems. The system and method presented herein are very well suited for communication with a satellite in deep space, for instance.

BACKGROUND OF THE INVENTION

So far mainly radio frequency (RF) links are used in order to provide for a communication between a ground station and a terminal carried by a satellite in deep space. In such communications systems typically one terminal is attached to the satellite whereas another terminal is either a ground based terminal or a terminal carried aboard of a second satellite in an orbit closer to the earth.

Various researchers and developers, however, are currently developing optical links to support deep-space communication to satellites.

The longer the distance between the two communication terminals gets, the more careful the link budget has to be designed. In particular the downlink budget, that is the budget of the link between the satellite in deep space and a ground based terminal, or a terminal in a lower orbit, has to be designed with great care.

But there are many other situations where optical links are needed that are able to reliably carry high data rates even if the optical channel is obstructed by fog or clouds, for instance.

SUMMARY OF THE INVENTION

It is an object of the present invention to provide a communications system for communication between two remote terminals, where even at very long distances between these two terminals and/or at very small signal-to-noise ratios (SNR) a robust communication is possible.

According to the present invention, an optical communications system is provided for communication between two optical terminals. At both terminals power Laser sources are used in order to be able to emit optical signals of sufficient energy.

Due to the physics of opto-electrical power conversion, the received optical power $P_{OPT}$ is translated into an electrical current $I_{EL}$ at the output of an optical detector, which is proportional to $P_{OPT}$. The electrical current $I_{EL}$ yields the electrical signal power $P_{EL} \cong (I_{EL})^2$ that is available for demodulation of the information signal. This "square law" nature of the opto-electrical power conversion pays off especially for the case of high pulse peak powers. Despite of increased electrical noise power due to higher bandwidth $BW_{EL} \approx 0.5/T_{SLOT}$ for narrow pulses of duration $T_{SLOT}$, the electrical signal power increases by a square law which outplays the linear increase of electrical noise power. For instance, by reducing a pulse slot duration by a factor 10, the bandwidth $BW_{EL}$ increases by about a factor 10 as well, resulting in ten times the amount of electrical noise power, whereas the electrical signal power $P_{EL}$ increases by a factor 100, resulting in an overall gain in electrical SNR by a factor 10. RF technologies just go with a linear increase in electrical signal power when increasing a RF signal pulse peak power into a narrower slot, resulting in no SNR gain, because electrical noise power increases by the same amount due to the higher bandwidth needed.

According to the invention a novel Pulse Position Modulation (PPM) scheme is provided that facilitates the raw data rate to be increased and which also enables obstructed optical channels to carry more data than a conventional PPM channel would be able to convey.

If designed properly, the novel PPM scheme can be used to transmit data at higher data rates than is possible with On-Off-Keying (OOK).

BRIEF DESCRIPTION OF THE DRAWINGS

For a more complete description of the present invention and for further objects and advantages thereof, reference is made to the following description, taken in conjunction with the accompanying drawings, which show.

DETAILED DESCRIPTION

Figure 1:
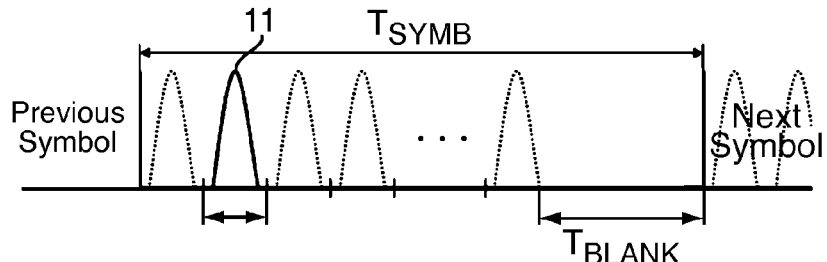
FIG. 1 a classical Pulse Position Modulation scheme utilized in a communication link.

Terms used in connection with the present description are also used in relevant publications and patents. However, it is to be noted that the use of these terms is merely to serve for better understanding. The ideas according to the present invention and the scope of protection of the claims are not to have their interpretation be restricted by the specific selection of terms. The present invention may be transferred without anything further to other conceptual systems and/or professional fields. The terms are to be applied appropriately in other professional fields.

The same reference numbers are used throughout the present text for identical and similar elements or features, but also for functionally similar elements or features of the invention.

When referring in the present context to optical channels, then unguided channels are meant. A channel is a link or connection. The expressions uplink and downlink, as well as the words first, second and so on, are only used to enable the reader to get a better and easier understanding of the invention. These expressions and words are not meant to limit the scope of protection.

The present invention concerns a point-to-point communications system where a single uplink transmitter communicates with a single uplink receiver over a channel with a single input and single output. The system may also comprise a single downlink transmitter that communicates data to a single downlink receiver. The system, however, is not limited to a single transmitter, only. Also, multi-channel transmission may be realized, for instance by wave division multiplexing.

In the following sections the concepts on which the invention is based are presented.

Optical Communication Technologies

An assessment has been made to determine how an optical channel link performance can be improved by enhancements in the selected technology. The criteria for an enhancement of the link performance is an increase in the link capacity (i.e. increased data rate and/or distance) that can be supported by the optical channel link, whilst still keeping the same link margin as achieved in the prior art. The options that can be considered to increase the link capacity are explained in the following subsections.

The present invention concerns novel and very powerful Pulse Position Modulation schemes. These various schemes will be developed in the following.

Reduced Blank Time and Alphabet Size

By reducing the blank time $T_{BLANK}$ and/or the alphabet size M of the Pulse Position Modulation (PPM) scheme one is able to reduce the symbol period $T_{SYMB}=T_{BLANK}+M \cdot T_{SLOT}$. This increases the raw data rate $R_{RAW}=\log_2(M)/T_{SYMB}$ that can be transferred over the optical channel link. However, the peak-to-average power ratio $T_{SYMB}/T_{SLOT}$ is reduced as well, which may render reliable communication over the optical channel link impossible (negative link margin) given the allowable optical transmit power and the path loss of the optical channel at hand.

Reduced Slot Time

Reducing the slot time $T_{SLOT}$ of the PPM scheme reduces the symbol period $T_{SYMB}=T_{BLANK}+M \cdot T_{SLOT}$. This increases the raw data rate $R_{RAW}=\log_2(M)/T_{SYMB}$ that can be transferred over the optical channel link, whereas the peak-to-average power ratio $T_{SYMB}/T_{SLOT}$ increases depending on the ratio $T_{BLANK}$ and $M \cdot T_{SLOT}$. However, the increase of the signal bandwidth of the optical channel link, which is proportional to $1/T_{SLOT}$, requires a larger receiver Signal-to-Noise Ratio (SNR), which again may render reliable communication over the optical channel link impossible (negative link margin). The increase in receiver SNR due to the increase of the signal bandwidth $1/T_{SLOT}$ outweighs the increase in the peak-to-average power ratio $T_{SYMB}/T_{SLOT}$ for blank times $T_{BLANK}$ that are small compared to $M \cdot T_{SLOT}$, i.e., the link margin decreases when reducing $T_{SLOT}$. When $T_{BLANK}$ is large compared to $M \cdot T_{SLOT}$, the link margin increases when reducing $T_{SLOT}$. In either case, the major problem when implementing a reduced slot time $T_{SLOT}$ is that the hardware components of the optical channel link do not support the increased signal bandwidth $1/T_{SLOT}$.

D-Dimensional PPM

One may define a special PPM bit-to-symbol mapping to increase the raw data rate $R_{RAW}$ that can be transferred over the optical channel link. For example, when using differential PPM (Diff-PPM), the delay between two consecutive pulses ranges from $T_{BLANK}$ to $T_{BLANK}+M \cdot T_{SLOT}$, where the modulation symbol $s_m$ encodes the time gap. This leads to a non-constant symbol period $T_{SYMB}$ equal to $T_{BLANK}+M/2 \cdot T_{SLOT}$ on average. The achievable raw bit rate increases significantly from $R_{RAW,PPM}=\log_2(M)/(T_{BLANK}+M \cdot T_{SLOT})$ to $R_{RAW,Diff-PPM}=\log_2(M)/(T_{BLANK}+M/2 \cdot T_{SLOT})$. The ratio between $R_{RAW,Diff-PPM}$ and $R_{RAW,PPM}$ can be as large as 2 when the blank time $T_{BLANK}$ becomes small. However, the data-dependent symbol period $T_{SYMB}$ requires more elaborate encoding and decoding in the transmitter and receiver, respectively, of the optical channel link. Also, the required receiver SNR to communicate data reliably using Diff-PPM is higher than that using PPM, since the Diff-PPM decoder typically suffers from error propagation. Finally, it is possible that the majority of pulses that comprise a frame are located very close to each other (clustering), which may overload the amplifier in the optical channel transmitter.

The problems described in connection with the above PPM schemes can be avoided by choosing a PPM scheme that lies conceptually in between conventional PPM and differential PPM. FIG. 1 depicts the PPM scheme utilized in a conventional solution of a communication link (called baseline PPM): a PPM symbol of duration $T_{SYMB}$ consists of M time slots of duration $T_{SLOT}$ and a blank time of duration $T_{BLANK}$. The PPM symbol carries exactly one pulse 11 located at either one of the M time slots. The raw data rate $R_{RAW}$ of the optical channel link follows to be $$R_{RAW}=\log_2(P)/T_{SYMB},$$

where P is the number of different pulse patterns that fit into the PPM symbol. Clearly, there are M such patterns, i.e., the pulse 11 is located in the first time slot, the second time slot, . . . or the $M^{th}$ time slot. The raw data rate $R_{RAW}$ is therefore equal to $\log_2(M)/T_{SYMB}$.

Figure 2:
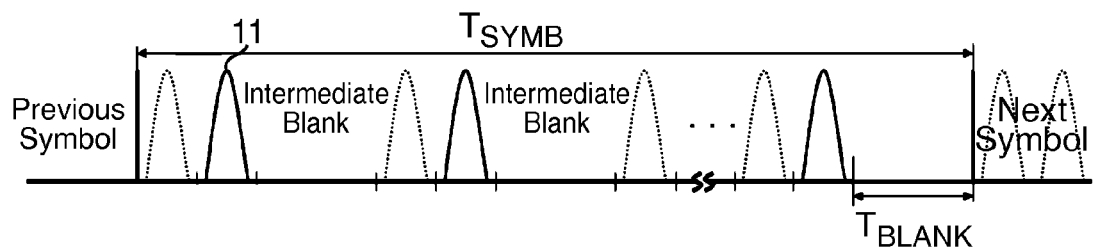
FIG. 2 a D-dimensional Pulse Position Modulation scheme for D=3, according to the present invention.

FIG. 2 depicts a D-dimensional PPM scheme for D=3. The PPM symbol in this scheme has a duration $T_{SYMB}$ and consists of $S=D \cdot (M+B)$ time slots of duration $T_{SLOT}$, where $T_{BLANK}$ is assumed to be a multiple of $T_{SLOT}$, i.e. $T_{BLANK}=B \cdot T_{SLOT}$ for B=0, 1, . . . . The PPM symbol carries exactly D pulses located at D of the S possible time slots. Certain communication devices, such as high powered optical communication devices are subject to the constraint that the time in between two consecutive pulses must be at least $T_{BLANK}$ and the last pulse 11 must be at least $T_{BLANK}$ away from the end of the PPM symbol. This constraint is also given in the inventive transmitters, since high power Lasers are used to bridge long distances or to ensure in case of obstructions that enough optical power is received at the receiver end. The raw data rate $R_{RAW}$ of the optical channel link follows to be $$R_{RAW}=\log_2(P)/T_{SYMB}$$

with $$P = \begin{pmatrix} D \cdot M \\ D \end{pmatrix}$$

and $$T_{SYMB} = D \cdot (M + B) \cdot T_{SLOT}.$$

The choice D=1 yields the PPM scheme of the baseline solution of the communication link shown in FIG. 1, where P=M. For larger dimensions D, the raw data rate $R_{RAW}$ is monotonically increasing with D. Eventually, the raw bit rate of the differential PPM scheme is attained when D approaches infinity. Clear advantages of this PPM scheme are that the PPM symbols have a constant, non-data dependent symbol duration $T_{SYMB}$ and that the decoder does not suffer from error propagation. The clustering of consecutive pulses is under full control by selecting the parameters D and B properly. Finally, the signal bandwidth of the optical channel link is not altered, i.e., the data rate increase is achieved without altering the link hardware and furthermore without significant increase of the required receiver SNR to communicate reliably over the link.

PPM with Overlapping Pulses

Figure 3:
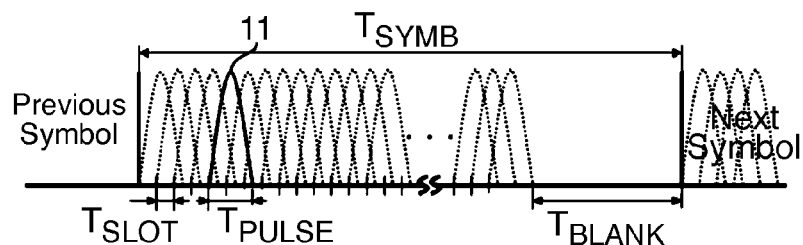
FIG. 3 a Pulse Position Modulation scheme with overlapping pulses, according to the present invention.

As mentioned before, reducing the slot time $T_{SLOT}$ of the PPM scheme reduces the symbol period $T_{SYMB}=T_{BLANK}+M \cdot T_{SLOT}$ and increases the raw data rate $R_{RAW}=\log_2(M)/T_{SYMB}$ that can be transferred over the optical channel link. However, the increase of the signal bandwidth of the optical channel link can be avoided by keeping the width $T_{PULSE}$ of the pulses utilized in the optical channel link constant. It follows that the pulse 11 shapes that belong to either one of the M time slots in a PPM symbol of duration $T_{SYMB}$ overlap as shown in FIG. 3. In this example PPM symbol, the ratio between $T_{SLOT}$ and $T_{PULSE}$ is ⅓. The raw data rate $R_{RAW}$ of a optical channel link using a slot time $T_{SLOT}$ that is smaller than $T_{PULSE}$ is still $\log_2(M)/T_{SYMB}$. The increase in data rate is at most equal to the ratio $T_{PULSE}/T_{SLOT}$. This maximum is achieved for $T_{BLANK}=0$. Using a PPM scheme with overlapping pulses thus tremendously improves the raw data rate at the same system bandwidth of the optical channel link, i.e., the hardware must not be replaced by more powerful components supporting a higher signal bandwidth. The PPM scheme with overlapping pulses thus is the preferred PPM scheme for the purposes of the present invention. Any of the other PPM schemes and embodiments presented herein are built on top or derived from the PPM scheme with overlapping pulses.

However, the required receiver SNR to communicate reliably over the link increases, since the pulse 11 accommodating a particular time slot overlaps with its neighboring slots. A method to overcome the appearance of errors in detecting the exact position of neighboring pulses is the application of non-symmetric Forward Error Correction (FEC) encoding techniques (set partitioning, multi-level coding), which protect the bits labeling the neighbors of a particular pulse in the PPM symbol stronger than those bits labeling pulses at time slots farther apart. In a preferred embodiment of the present invention thus the PPM scheme with overlapping pulses is employed together with an asymmetric FEC encoding technique.

D-Dimensional PPM with Overlapping Pulses

Figure 4:
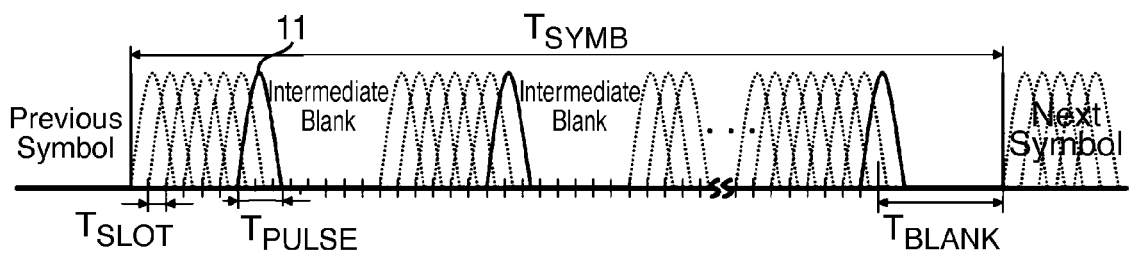
FIG. 4 a 3-dimensional Pulse Position Modulation combined with overlapping pulses for $T_{PULSE}/T_{SLOT}=2$, according to the present invention.

In a further embodiment, the PPM scheme using overlapping pulses is combined with the D-dimensional PPM—described above. This combination is shown in FIG. 4. It results in a further increase of the raw data rate.

PPM Combined with Amplitude Modulation

Figure 5:
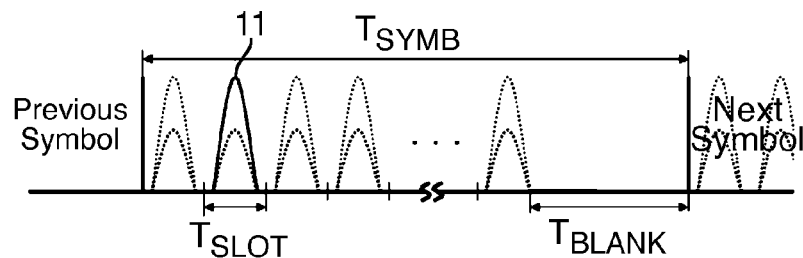
FIG. 5 a Pulse Position Modulation scheme combined with amplitude modulation for A=2, according to the present invention.

Yet another embodiment of the invention is implemented using another strategy. This strategy is suggested for improving the capacity of the optical channel link, i.e. to combine the PPM scheme with overlapping pulses introduced in the previous section with amplitude modulation (AM), i.e., each pulse 11 in the PPM symbol can take on A=1, 2, ... amplitude levels. FIG. 5 depicts the PPM scheme utilized in the baseline solution of the communication link combined with amplitude modulation (AM) for A=2. The raw data rate $R_{RAW}$ of the optical channel link follows to be $$R_{RAW}=\log_2(A \cdot M)/T_{SYMB}.$$

However, similar to the PPM with overlapping pulses scheme explained above, the required receiver SNR to communicate reliably over the link increases, since the amplitude-modulated pulses are more prone to detection errors. Similar to the previous approach, a method to overcome the appearance of errors in detecting the exact position of neighboring pulses is the application of non-symmetric Forward Error Correction (FEC) encoding techniques, which protect the bits labeling the neighbors of a particular pulse in the PPM symbol stronger than those bits labeling pulses at time slots farther apart.

D-Dimensional PPM with Amplitude Modulation

Figure 6:
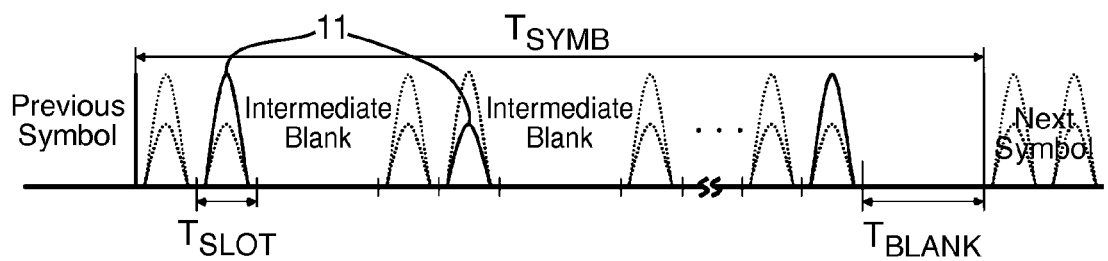
FIG. 6 a 3-dimensional Pulse Position Modulation combined with Amplitude Modulation for A=2, according to the present invention.

The D-dimensional PPM explained before can be combined with Amplitude Modulation (AM) as well, as shown in FIG. 6, which depicts a 3-dimensional PPM combined with AM for A=2. The raw data rate $R_{RAW}$ of the optical channel link follows to be $$R_{RAW} = \log_2(P)/T_{SYMB}$$

with $$P = A^D \cdot \begin{pmatrix} D \cdot M \\ D \end{pmatrix}$$

and $$T_{SYMB} = D \cdot (M + B) \cdot T_{SLOT}.$$

The choice D=A=1 yields the PPM scheme of the classical solution of the communication link shown in FIG. 1, where P=M. This PPM scheme combines the advantages of the D-dimensional PPM (constant symbol duration $T_{SYMB}$, no error propagation, controlled pulse 11 clustering, constant signal bandwidth) with the data rate enhancement of Amplitude Modulation.

As part of these considerations, hereinafter another appropriate and inventive PPM modulation scheme is provided.

D-Dimensional PPM with Amplitude Modulation and with Overlapping Pulses

Figure 7:
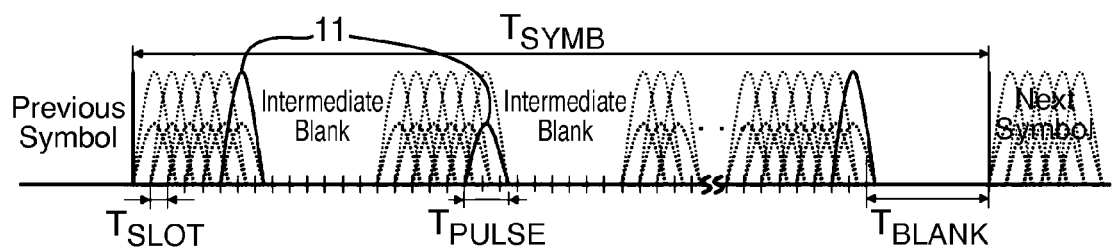
FIG. 7 a 3-dimensional Pulse Position Modulation combined with Amplitude Modulation for A=2 and overlapping pulses for $T_{PULSE}/T_{SLOT}=2$, according to the present invention.

In a currently preferred embodiment, a combination of the D-dimensional PPM with amplitude modulation and the PPM using overlapping pulses is used, as shown in FIG. 7, which results in a further increase of the raw data rate.

As an example of the benefits of an approach based on the present invention, the results of the improvement of the raw data rate of the optical channel link when using D-dimensional PPM combined with amplitude modulation for A=4 and overlapping pulses with $T_{PULSE}/T_{SLOT}=4$ instead of the common one-dimensional PPM can be calculated as: 175 Mbps/40 Mbps−1=337%, which means an improvement of more than 3 times of the raw data rate is achievable.

IMPLEMENTATION EXAMPLES

Embodiments

Figure 8:
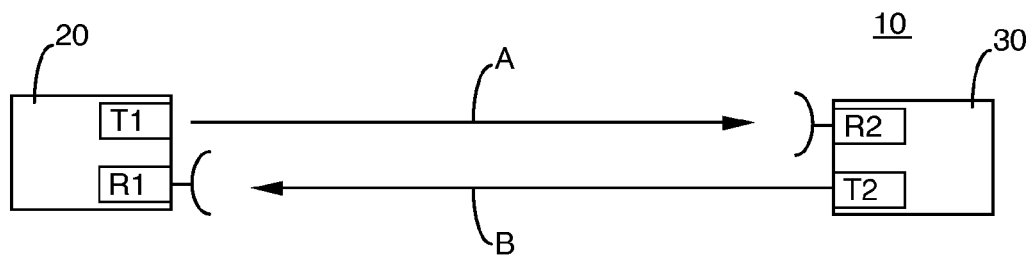
FIG. 8 a schematic diagram of a communications system in accordance with a first embodiment of the present invention.

The basic functions of the present invention are now described in the context of a first embodiment. This embodiment of the Laser communication system is schematically illustrated in FIG. 8. As it can be seen on this figure, the Laser communications system 10 comprises a first transceiver 20 and a second transceiver 30 for establishing two optical channels A, B there between.

Figure 9:
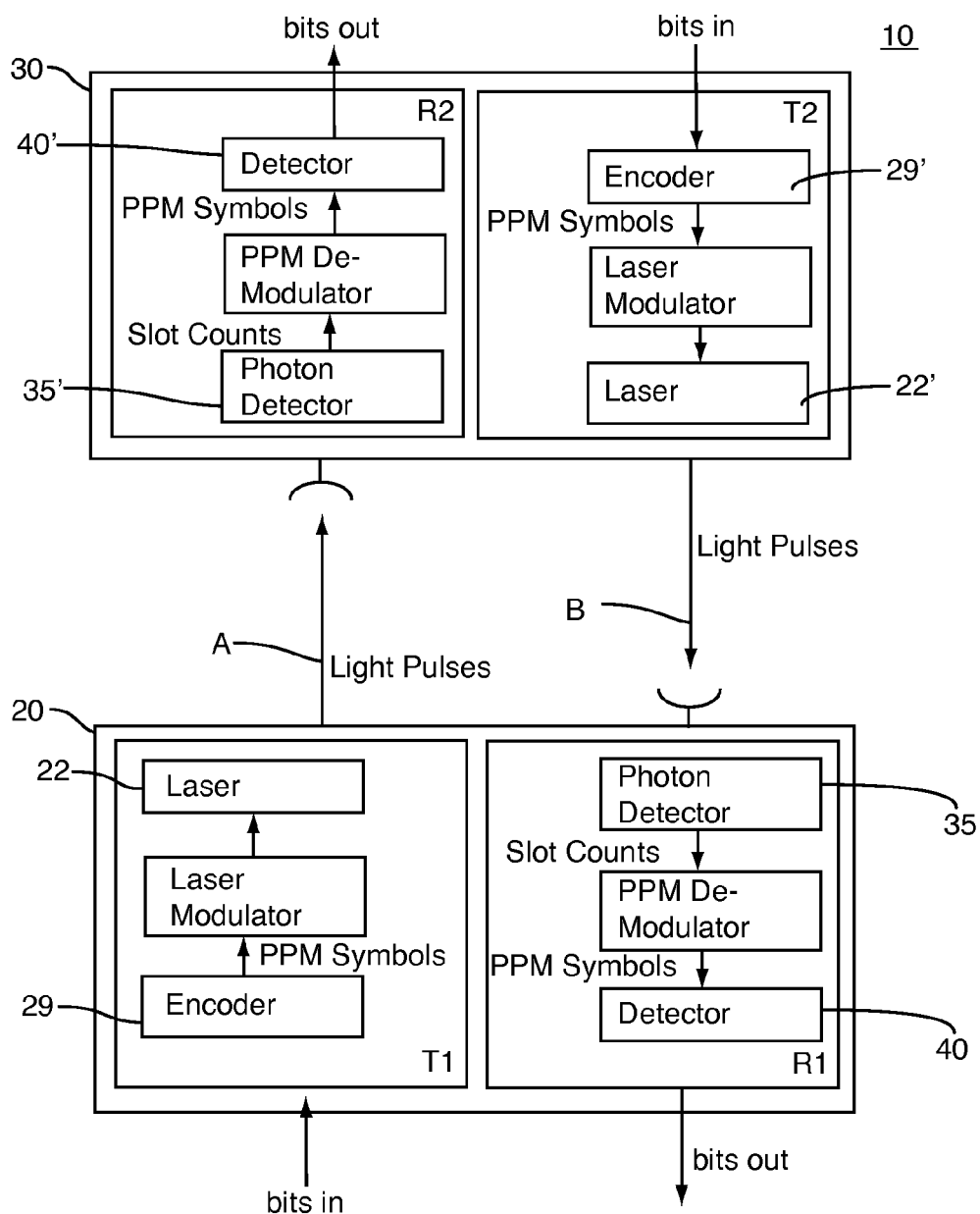
FIG. 9 a schematic diagram of a communications system in accordance with a first embodiment of the present invention.

Further details of the Laser communication system can be seen on FIG. 9. According to the present invention, the first transceiver 20 comprises a first transmitter T1 with a Laser light source 22 for transmitting optical pulse position modulated signals encoded by the encoder 29 into a first of said optical channels A and further comprising a receiver R1 for receiving the PPM symbols, a photon detector 35 such as a photo diode, a PPM demodulator and a PPM detector 40. FIG. 9 also shows the second transceiver 30 as comprising a second transmitter T2 with a Laser light source 22' for transmitting optical pulse position modulated signals encoded by the encoder 29' into the second optical channel B and further comprising a receiver R2 for receiving the PPM symbols, a photon detector 35' such as a photo diode, a PPM demodulator and a PPM detector 40'.

In the following, the main components of the system 10 are described.

PPM Encoder 29/29' Implementation

Figure 10:
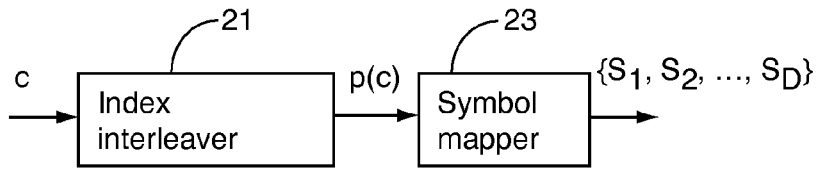
FIG. 10 a generic implementation of a Pulse Position Modulation encoder in accordance with the present invention.

FIG. 10 depicts the generic implementation of the PPM encoder 29/29' in the transmitter T1/T2. The data bits are grouped to yield a series of indices c. Each index c is mapped to the new index value p(c) in the bit interleaver 21 using the permutation function p(•). Finally, each permuted index p(c) is mapped to a set of symbol indices $\{s_1, s_2, \ldots, s_D\}$, which indicate the D pulse positions in a D-dimensional PPM symbol. This mapping is realized by the symbol mapper 23.

According to the present invention, the total number of pulse 11 positions (time slots) in the PPM symbol is S=D·(M+B), where B is the number of blank time slots. It follows that the symbol indices $s_i$ take on values from the alphabet $\{0, 1, \ldots, S-1\}$, where the position count starts with 0. The number P of possible pulse 11 position constellations is $$P = \binom{D \cdot M}{D}.$$

It follows that the index c as well as p(c) take on values from the alphabet $\{0, 1, \ldots, P-1\}$. In practice, the optical channel transmitter restricts the size of the alphabet of c as well as p(c) to be a power of two. In this case, the data bits are easily mapped to the indices c.

When the PPM is combined with AM, the easiest way to encode the A amplitude levels is to simply take some of the data bits to be encoded to directly modulate the amplitude level. This works well as long as A is a power of two.

PPM Detector 40/40' Implementation

Figure 11:
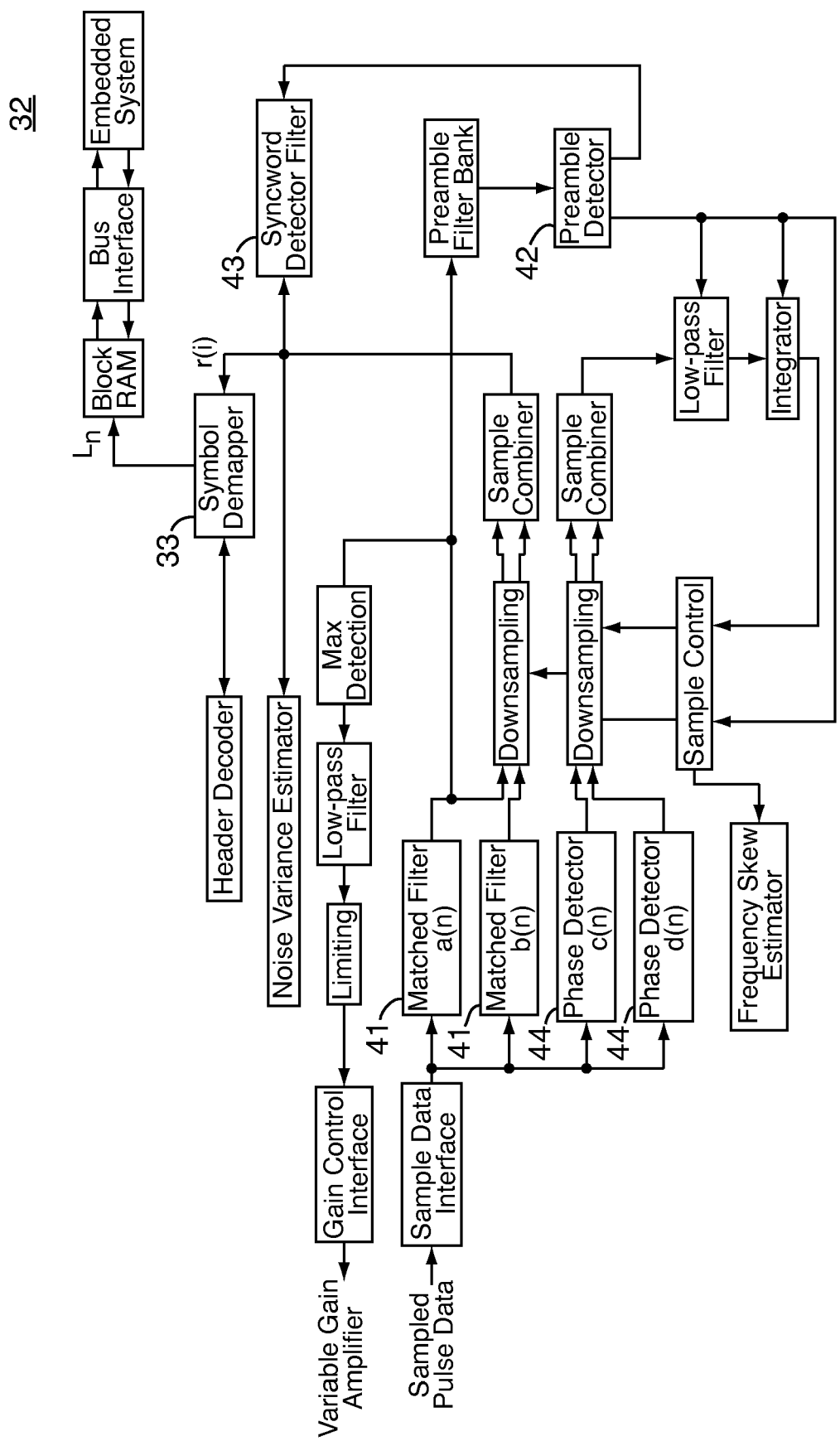
FIG. 11 a block diagram of the frame and symbol detector in accordance with the present invention.

FIG. 11 depicts the generic implementation of the PPM detector 40/40' in the optical channel receiver. This all-digital detector provides log-likelihood ratios (LLRs) about the bits encoded by the PPM encoder in the optical channel transmitter. Its building blocks will be described in further sections. One should note that this detector can be applied to any PPM scheme according to the present invention.

Algorithmic Communication Link Description

Figure 12:
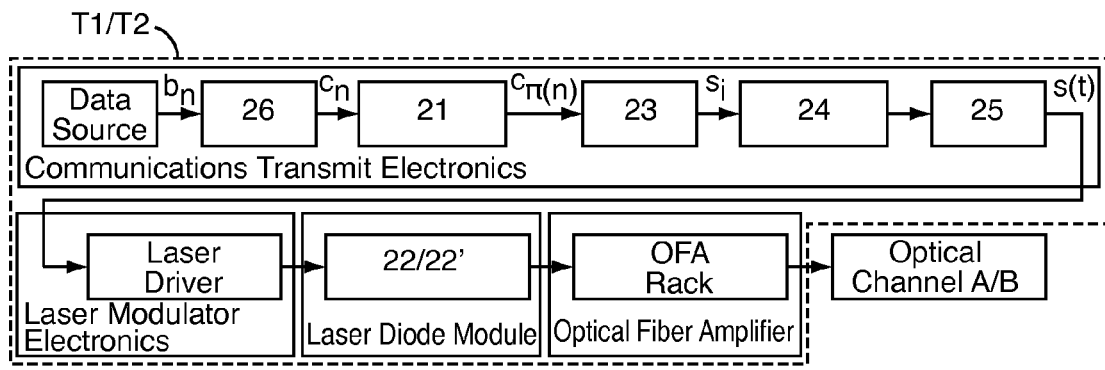
FIG. 12 the functional blocks of the transmitter side of the communication link on the algorithmic level in accordance with the present invention.
Figure 13:
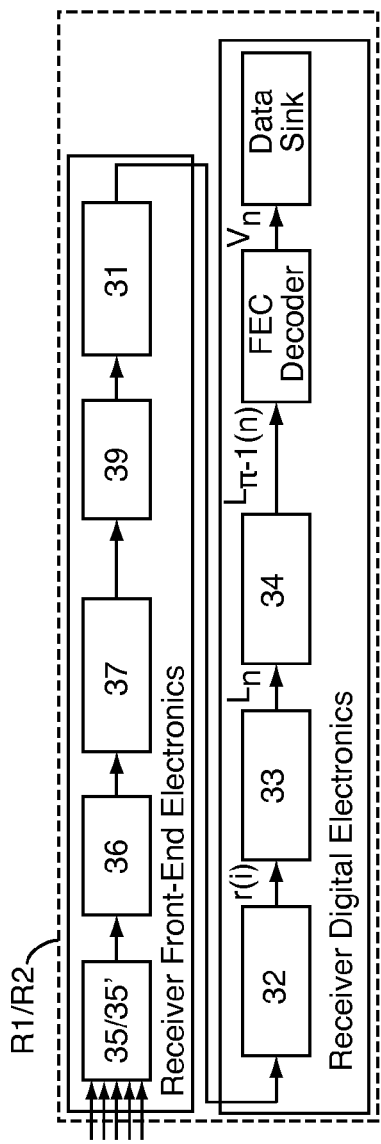
FIG. 13 the functional blocks of the receiver side of the communication link on the algorithmic level in accordance with the present invention.

This section describes the functional blocks of the communications subsystem of the Laser communication system 10 on the algorithmic level. The functional blocks of the complete system 10 were introduced in the previous section. FIGS. 12 and 13 show the functional blocks of the communication link on the algorithmic level.

The communication subsystem performs point-to-point communication, i.e., a single transmitter T1 or T2 communicates data to a single receiver R1 or R2 over a channel A or B with a single input and single output. The communication transmit electronics maps the data bits $b_n$ from the alphabet $\{0, 1\}$ to the symbols $s_i$ from the alphabet $\{0, 1, \ldots, S-1\}$ and assigns to each symbol $s_i$ the analog waveform s(t). This mapping involves an FEC encoder 26, a bit interleaver 21, a symbol mapper 23, and a frame generator 24. The waveform s(t) modulates the Laser driver circuit on the Laser modulator electronics, which drives a Laser diode 22/22' on the Laser diode mount. The output of the Laser diode 22/22' is amplified by an optical fiber amplifier (OFA), which finally provides the optical output signal of the communication link.

The modulation scheme for transmitting information with the communication link is one of the various inventive pulse position modulation (PPM) schemes described in the previous sections of the present application.

Transmitter Functional Blocks

This section describes the main functional blocks of the transmitter section, c.f. FIG. 12, of the communication link of the Laser communication system according to the present invention.

FEC Encoder 26

Figure 14:
FIG. 14 the basic structure of the encoder, according to the present invention.

The communication link implements a forward-error-correction (FEC) scheme that encodes the data bits $b_n$ to the code bits $c_n$ by adding redundancy to the data stream. This allows to detect and to correct transmissions error in the receiver R1 or R2. According to the present invention, a Turbo product code IP core is preferred to minimize the design time and risk. FIG. 14 depicts an example of an encoder of this class of FEC schemes.

Bit Interleaver 21

The optical channel between the transmitter T1/T2 and the receiver R1/R2 of the Laser communication system suffers for instance from atmospheric fades due to turbulences in the air, i.e., it can happen that the receiver SNR declines below the minimum level required for a reliable communication. The amplitude fades can seriously impair the communication link performance unless the optical link budget takes the fades fully into account. However, the available optical transmit power does not allow doing that. Instead, the fades are averaged out by utilizing a bit interleaver 21 which shuffles a long-enough sequence of coded bits $\{c_n\}$ using the index permutation function n(n). That is, after interleaving the coded bits are reordered to the sequence $\{c_{n(n)}\}$.

Symbol Mapping 23

The symbol mapper 23 in the transmitter block of the communication link depicted in FIG. 12 maps the interleaved coded bits $c_{n(n)}$ from the alphabet $\{0, 1\}$ to the symbols $s_i$ from the alphabet $\{0, 1, \ldots, S-1\}$. The symbol $s_i$ indicates the position of the Laser pulse 11 within the symbol period $T_{SYMB}$.

Frame Generation 24

Figure 15:
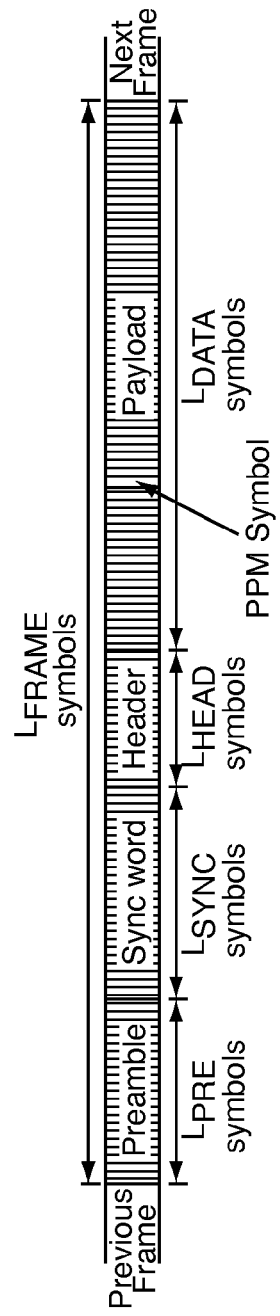
FIG. 15 the frame definition as used herein.

The frame generation 24 block in the transmitter of the communication link block diagram depicted in FIG. 12 takes a sequence of symbols $s_i$ with i=1, 2, . . . , $L_{DATA}$ and adds further symbols before and after the length-$L_{DATA}$ payload section of the frame to aid the receiver to detect and identify the frame. FIG. 15 depicts the frame format that is applied for the optical channel link.

Receiver Functional Blocks

This section describes the main receiver functional blocks of the Laser communication system depicted on FIG. 13.

Avalanche Photo Diode 35/35'

The first component of the receiver chain in FIG. 13 is the APD-TIA module 35/35' on the receiver front-end electronics, which is an avalanche photo diode (APD) coupled with a trans-impedance amplifier (TIA). The APD-TIA module converts the received optical power into an electrical power.

Low-Noise Amplifier 36 and Variable Gain Amplifier 37

The low-noise amplifier (LNA) 36 and the variable gain amplifier (VGA) 37 on the receiver front-end electronics amplify the received signal voltage. The amplification (or attenuation) of the VGA that is controllable via software running on the Field Programmable Gate Array (FPGA) of the receiver digital electronics. This software adapts the received signal to the dynamic range of the analog digital converter (ADC) 31 sampling the received signal.

Anti-Aliasing Filter 39 and Analog-to-Digital Converter (ADC) 31

In between the VGA 37 and the ADC 31 is an anti-aliasing filter 39 that minimizes the aliasing occurring during sampling. The sample frequency of the ADC 31 need not be related to the slot time $T_{SLOT}$ of the optical channel link. It must only be at least twice as high as the signal bandwidth of the received signal.

Frame and Symbol Detector 32,33

FIG. 11 depicts the block diagram of the frame and symbol detector 32 and the symbol demapper 33 in the receiver processing chain (see FIG. 13). The frame and symbol detector 32 is an essential element of the present invention, since without this block 32 it would not be possible to process the received signals in an appropriate and reliable manner. The two blocks 32 and 33 are entirely implemented in the digital domain on the FPGA of the receiver digital electronics. The output r(i) of the frame and symbol detector block 32 contains information about the likelihood that the received signal in the time slot at time $i \cdot T_{SLOT}$ contained a pulse 11 or not. The log-likelihood ratio (LLR) $L_n$ at the output of the symbol demapper 33 is the ratio of the logarithm of the likelihoods that the coded bit $c_n$ with index n was 0 or 1, respectively, given the information contained in the received signal.

Pulse Detection and Slot Time Recovery Algorithm

The most important task of the frame and symbol detector block 32 is the pulse 11 detection and slot time recovery algorithm. The goal of this functional part is to perform matched filtering in order that the received pulses 11 can be detected with minimum error probability and to track the phase difference (here: time delay) between the received pulses and matched filter pulse templates in order that the local slot time is equal to that of the transmitter. FIG. 11 depicts the most important pulse detection and slot time recovery algorithm blocks consisting of the matched filters 41, the phase detectors 44, the downsamplers, the sample combiners, the low-pass filter, the integrator, and finally the sample control block. The pulse detection and pulse slot time recovery algorithm implemented in the frame and symbol detector block requires that the matched filter impulse response h(n) and the phase detector impulse response g(n) can be shifted in time with a delay resolution $\Delta t$ that is much smaller than the sample period of the ADC 31. One possible way to implement this function is to instantiate a bank of matched filters 41 and phase detector 44 with impulse responses $h_{\Delta t}(n)$ and $g_{\Delta t}(n)$ for various $\Delta t$. After filtering the sampled received signal with all filters in the filter bank, the correct output is chosen according to the desired $\Delta t$. However, implementing this filter bank at the required delay resolution, which should be around one tenth of the ADC sample period, is extremely difficult due to the large amount of consumed hardware resources. Instead, the filter bank is implemented using linear approximations of the impulse responses $h_{\Delta t}(n)$ and $g_{\Delta t}(n)$:

$$h_{\Delta t}(n) = a(n) + b(n)\Delta t,$$

$$g_{\Delta t}(n) = c(n) + d(n)\Delta t.$$

This approximation requires to implement only 4 filters with the impulses responses a(n) and b(n) for the matched filter and c(n) and d(n) for the phase detector. The achievable delay resolution $\Delta t$ is arbitrarily small being limited only by the finite word width arithmetic in the FPGA implementation of the frame and symbol detector block 32.

Gain Control Algorithm

The first task of the frame and symbol detector block 32 is the control of the gain of the VGA 37 on the receiver electronics. The goal of this functional part is to make sure that the peaks of the received signal are within a predefined voltage range fitting into the operating range of the ADC 31.

Preamble Detection Algorithm

The goal of the preamble detection algorithm is to find the preamble 12 of the transmitted frame in the received signal samples as well as to establish a coarse slot time synchronization between the transmitter T1/T2 and the receiver R1/R2. FIG. 11 depicts the most important preamble detection algorithm blocks comprising the preamble filter bank and the preamble detector.

Syncword Detection Algorithm

The goal of the syncword detection algorithm is to find the syncword 13 of the transmitted frame in the received signal samples. FIG. 11 depicts the syncword detection algorithm as a single block.

Symbol Demapper 33

FIG. 11 depicts the symbol demapper 33, which is part of the receiver processing chain presented in FIG. 13. The symbol demapper 33 processes the output samples r(i) of the frame and symbol detector block 32 that contain information about the likelihood that the received signal in the time slot at time $i \cdot T_{SLOT}$ contained a pulse 11 or not. The index counter i=0, 1, . . . of the samples r(i) starts with the reception of the payload 15 of the frame right after the reception of the header 14.

Bit Deinterleaver 34 and FEC Decoder

The bit deinterleaver 34 in the receiver processing chain depicted on FIG. 13 reorders the LLRs $L_n$ provided from the symbol demapper 33 according to the permutation function $n^{-1}(n)$. This function is the inverse of the permutation function n(n) utilized by the bit interleaver 11 in the transmitter of the optical channel link.

The FEC decoder in the receiver processing chain from FIG. 13 can be a "Commercial-Off-The-Shelf" (COTS) software IP core for iterative decoding of the Turbo Product Code (TPC)-encoded data bits $b_n$ yielding the decoded data bits $v_n$. To do that, the core expects LLRs about the code bits $c_n$, which are provided (after deinterleaving) by the symbol demapper 33.

Areas of Applicability

The communication system according to the present invention may be used in different kinds of links, such as inter-satellite links, air-to-air or deep space communications.

Spacecraft Application

Figure 16:
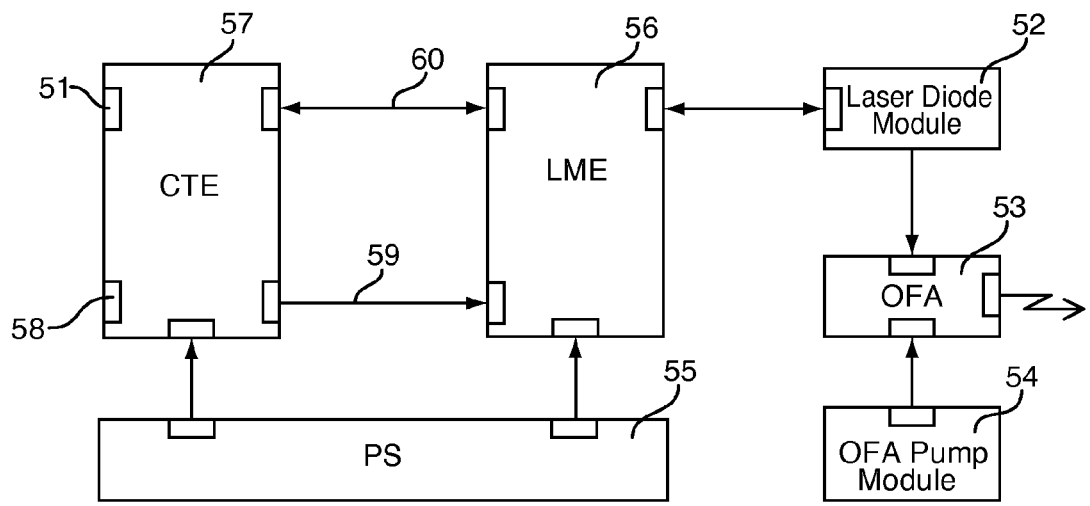
FIG. 16 a block diagram of the spacecraft electronics for the optical communication system employed in a space application in accordance with the present invention.

This section explains the implementation of the transmitter of the optical communication system in a spacecraft. This implementation differs from that for the ground application, since the spacecraft electronics must be flight-worthy. In any case, the algorithmic functions implemented in the spacecraft transmitter are identical. According to an embodiment of the present invention, the receiver of the optical communication link is located on the ground. FIG. 16 depicts the block diagram of the spacecraft electronics for the optical communication system.

The Power Supply (PS) 55 converts the supply voltages supplied by the spacecraft to those required by the Communications Transmit Electronics (CTE) 57 and the Laser Modulator Electronics (LME) 56. The data to be transmitted by the optical link is fed into the transmitter via the user data interface 51 providing data rates that are large enough to serve the demand of the link transmitter (several tens of Mbps). The transmitter is configured via the TErminal COntrol (TECO) interface 58.

The CTE 57 contains an FPGA that implements all control and signal processing functions of the transmitter T1/T2. The FPGA transfers the serial transmit data stream to the LME 56 via the transmit data interface 59. This is done by driving a seed Laser diode 22/22' on the Laser diode module 52, which in turn drives an optical fiber amplifier (OFA) 53 that outputs multi-watt Laser pulses. The LME 56 is controlled and monitored by the FPGA on the CTE 57 via the Laser modulator control interface 60.

Other Application Areas

According to the present invention, an active beacon-assisted acquisition and tracking approach may be employed where an uplink Laser beacon is tracked by the satellite in deep space.

The invention presented herein is also very well suited for space communications across the solar system, including among others inter-planetary links, formation flights (air-to-air), inter-satellite links between planetary orbits and satellite <-> ground, satellite <-> aerial vehicle scenarios. "Ground" in this sense includes both, fixed and mobile ground stations.

The invention can also be employed for communicating inside or across the atmosphere, since it is very robust even in situations where the channel is disturbed by clouds or fog.

These and other aspects of the inventive apparatus are covered by the apparatus claims 14 through 28.

What is claimed is:

1. Method comprising the steps:
   at a transmitting side of an optical channel providing bits for transmission across the optical channel,
   processing the bits by performing a bit-to-symbol mapping in order to map said bits into PPM symbols, where
      each PPM symbol has a symbol duration comprising D*M time slots and a blank time of blank time duration,
      each time slot has a slot duration,
      the blank time duration is D*B times the slot duration, where B defines the number of blank time slots, being an integer number $\geq 1$,
      the parameter D is an integer number $\geq 2$ defining the number of pulses located at D of the D*(M+B) time slots,
      M defines the alphabet size, or number of pulse positions that a modulated pulse can assume, in the PPM scheme, with M being an integer number $\geq 4$,
      where each pulse has a pulse duration, and
      where said slot duration is shorter than said pulse duration so as to provide for theoretically overlapping pulses inside each PPM symbol;
      where said theoretically overlapping pulses are provided inside each PPM symbol in order to provide for an increased raw data rate for the transmission of the bits across said optical channel,
      where an overlap ratio is defined by pulse duration/slot duration said ratio preferably being equal to 2 or equal to 3; and
   between two consecutive pulses of the PPM symbol there is al least one blank time of one blank time duration and the last pulse of the respective PPM symbol is at least one blank time of one blank time duration away from the end of the respective PPM symbol,
      an amplitude modulation is applied so that each of said pulse of a PPM symbol can take A different amplitude levels, where A is the number of available amplitude levels, said amplitude modulation being applied to further increase said raw data rate,
      where a number P of different pulse patterns contained in each of said PPM symbols is defined by $$P = A^D \cdot \binom{D \cdot M}{D}.$$

2. The method of claim 1, wherein said symbol duration is constant and non-data dependent.

3. The method of claim 2, wherein an asymmetric FEC encoding technique is employed on the transmitting side prior to performing said bit-to-symbol mapping.

4. The method of claim 3, wherein a baseline PPM scheme is employed to generate a synchronization word.

5. The method of claim 4, wherein said synchronization word together with a number of said PPM symbols are transmitted across said optical channel to a receiving side.

6. The method of claim 5, wherein at the receiving side a matched filtering approach is employed for processing the PPM symbols received.

7. The method of claim 5, wherein matched filter samples are produced at each slot time, these matched filter samples being ordered such that they correspond to the correct position of the pulses in the received PPM symbols.

8. The method of claim 5, wherein at the receiving side data bits from the PPM symbols received are mapped to symbol positions and wherein said synchronization word is used to synchronize said receiving side with respect to said transmitting side.

9. The method of claim 5, wherein a matched filter impulse response $h_{Af}(n)$ of matched filters and a phase detector impulse response $g_{Af}(n)$ of phase detectors are linearly approximated, which yields a very efficient implementation of the matched filters and the phase detectors using only four filters.

* * * * *

UNITED STATES PATENT AND TRADEMARK OFFICE
CERTIFICATE OF CORRECTION

| | | |
|---|---|---|
| PATENT NO. | : 8,081,882 B2 | Page 1 of 1 |
| APPLICATION NO. | : 11/971274 | |
| DATED | : December 20, 2011 | |
| INVENTOR(S) | : Michael Tüchler | |

It is certified that error appears in the above-identified patent and that said Letters Patent is hereby corrected as shown below:

In column 12, line 16, the word "al" should read "at."

Signed and Sealed this
Thirteenth Day of March, 2012

David J. Kappos
*Director of the United States Patent and Trademark Office*